March 30, 1937. O. B. CARSON 2,075,020
GOGGLES, SPECTACLES, OR THE LIKE
Filed May 28, 1936
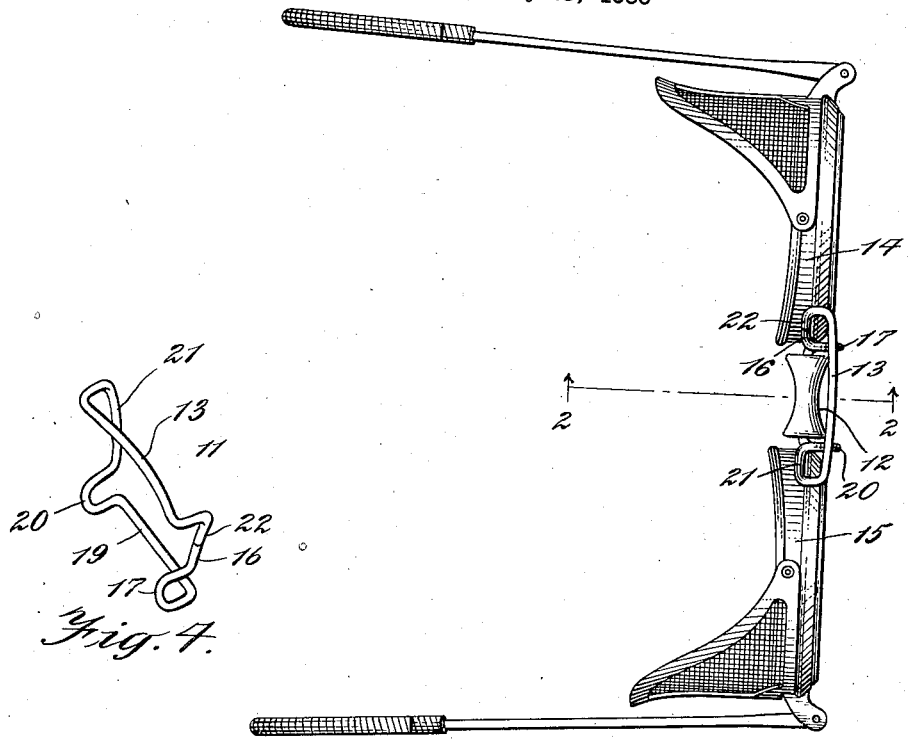
Fig. 1.
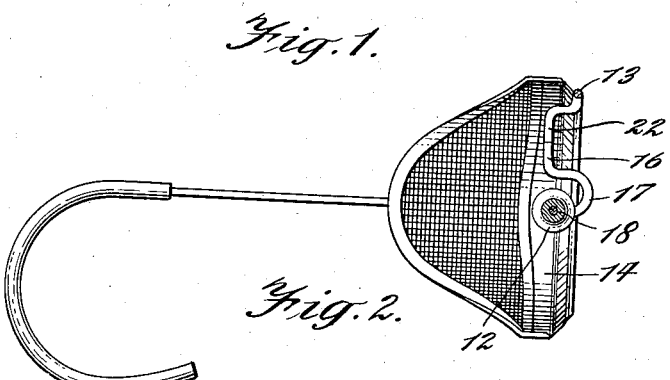
Fig. 2.
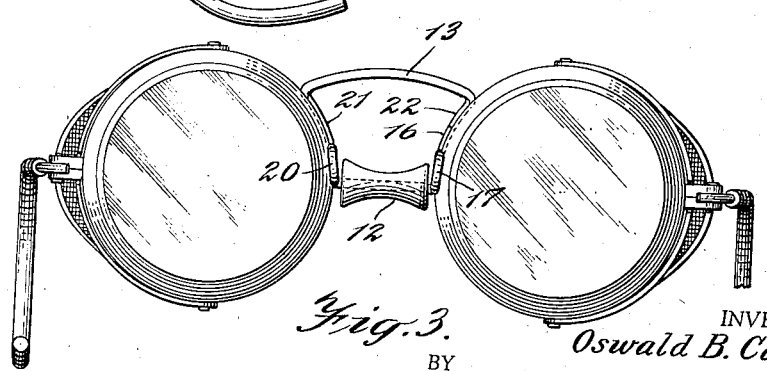
Fig. 3.
Fig. 4.
INVENTOR.
Oswald B. Carson
BY Waldo M. Chapin
ATTORNEY.

Patented Mar. 30, 1937

2,075,020

UNITED STATES PATENT OFFICE 2,075,020

GOGGLES, SPECTACLES, OR THE LIKE

Oswald B. Carson, Scarsdale, N. Y.

Application May 28, 1936, Serial No. 82,246

5 Claims. (Cl. 88—41)

My invention relates to improvements in goggles of the type generally known as industrial goggles which are used by operatives in occupations where protection of the eyes against accidental injury or glare is necessary. The particular feature of my invention resides in the novel construction of the so-called bridge portion, or that part which spans the space between the lens-holding rims and which serves to maintain the lenses in spaced relation and alignment with one another as well as providing a nose-rest portion which serves to carry the weight of the goggles on the bridge of the wearer's nose.

An object of my invention is to provide a self-seating nose-rest carried on a supporting member so formed that all desirable adjustments may be readily made with the fingers to accommodate a wide range of facial and nasal contours, without the necessity of using pliers or other tools.

A further object is to provide this said feature in a simple, practical manner so that the goggles may be manufactured at a minimum of cost.

Goggles utilized by operatives in occupations hazardous to the eyes must necessarily be of a strong, rugged construction and be fitted with relatively heavy lenses which are sufficiently sturdy to resist sudden impacts and thus protect the eyes. This requires that the goggles be made considerably heavier than ordinary spectacles, and, because of the frequent necessity for wearing goggles continuously, or for long periods, it is essential that they be made as light and as comfortable as possible consistent with the strength and protection required. Furthermore, because of the wide variation in facial characteristics of workmen, which would otherwise require the manufacturer to provide a wide range in bridge sizes, it is most desirable that such goggles be made in one size with a correspondingly wide range of adjustability, and in a way that such adjustability may be effected by any wearer not expert in the fitting and adjustment of glasses, and without the use of pliers or other optician's tools.

It is a further object of my invention to provide a bridge member having the above characteristics which will be neither unwieldly nor tend to obstruct the wearer's vision at any desirable angle, this being a desideratum for the reason that in certain work requiring protection by goggles, for example, from glare and flying sparks as in welding operations, there is at best a tendency to blur the vision, and it is therefore desirable to provide a wide, unobstructed field of vision.

A cognate object of my invention is to provide a structure in which the above desirable features will be embodied with a minimum number of parts.

Similarly, an object is to provide for adjustability in a structure embodying a one-piece bridge element made of wire, of such contour that the wearer, unskilled in such adjustments, will be aided by the existence of simple bend lines to effect the really necessary bending adjustments without tendency to make unnecessary bends of a sort likely to be destructive.

A description of my improved goggles is given in detail in the following specification and its accompanying drawing, in which:

Fig. 1 is a plan view of a pair of goggles in the construction of which my improved bridge member has been embodied;

Fig. 2 is a view of the same in vertical section taken on the line 2—2 of Fig. 1;

Fig. 3 is a view thereof in front elevation, and

Fig. 4 is a detail view in perspective of my improved nose bridge, shown separately.

As will be noted in the accompanying drawing, my invention is therein shown as comprising a single piece of pliable wire 11 on which a spool-shaped, nose-bearing element 12 is disposed. This wire is so formed as to provide an upper, horizontal bridge span 13 for holding the lens rims 14 and 15 in spaced relation and alignment. One end 16 of the wire is bent downward for a short distance, conforming to the curve of the lens rim to which it is rigidly attached as by soldering or welding. Continuing downward it is formed in a vertically and forwardly disposed loop 17 at right angles to the plane of the lens. Then it has a reach 19 which passes through an axial bore 18 in the cylindrical or spool-shaped element 12, emerging on the opposite side of the spool, it is again formed in a vertical loop 20, which is a complement of loop 17, then passes upward as at 21, being so bent as to be snugly attached by solder or the like to the opposite lens rim 15, and thence to the bridge piece proper 13, and terminating at the other end 22 adjacent the end 16 of the wire, as shown.

The open loops 17 and 20 at either end of the spool-shaped bridge member are sufficiently pliable so that the relative position of the nose-engaging member 12 may be changed by bending forward, backward, upward or downward, and this can be effected without any special training as the structure above disclosed clearly lends itself to bending at the requisite points. Also, the distance between the lens rims may be opened up or closed in by bending the loops 17 and 20 away from or toward each other so that they are distorted out of their normal vertical position, while at the same time the upper transverse member 13 may be suitably bent to lengthen or shorten the distance between the lens-holding member at the top.

In this construction it will be noted that the entire bridge portion is made with relatively few and simple bends from a single piece of pliable wire. This is most important from the standpoint of simple, economical manufacture.

While the use of a spool-shaped nose-contacting element whose outer concave peripheral surface conforms closely to the convex curvature of the wearer's nose is not a new feature and is not claimed herein by itself, its combination with a one-piece, adjustable wire bridge element in the particular form herein shown is believed to be new, and it is desirable from the fact that it is easily formed and assembled, as well as being inexpensive. Furthermore it also provides all of the elements of adjustability without tools necessary to secure easy fitting and comfortable wear.

This spool-shaped element may be made of any suitable material such as hard rubber, bakelite or other plastic, wood or metal. The use of non-metallic material is preferred for sanitation, lightness and better heat-insulating values and it can be worn with greater comfort.

While the two ends of the wire desirably meet at a point where they join one of the lens-holding rims, as shown, for the sake of greater sturdiness, it will be understood that this showing is not intended to exclude a meeting of the two ends of the wire at a point which may be within the axial bore through the spool-shaped member.

I claim:—

1. A bridge element for goggles comprising in combination a single piece of pliable wire formed to span the upper space between the lens holding rims, one end attached to one of said rims, the other end passing downward for an appreciable distance and attached to the opposite rim, then formed into a vertical looped portion at right angles to the plane of the lenses, then passing in a straight horizontal direction through a spool-shaped nose-contacting element, then upward in a second vertical loop substantially parallel to the first loop and then upward in attachment to the opposite lens holding rim.

2. A bridge element for spanning the space between suitable lens-holding members of a pair of goggles, spectacles or the like, said element comprising a wire frame having upright side members and transverse upper and lower members, said frame being characterized by having the upright side members formed to be attached to said lens-holding members, respectively, throughout a substantial distance thereof along the outside peripheral surfaces of the lens holding members, also by having said lower transverse member connected with each of said side members by an upright open loop disposed forwardly from said lower transverse member, and said upper transverse member being joined to said side pieces, respectively, by relatively short, forwardly extending reaches of the wire component.

3. A bridge element for spanning the space between suitable lens-holding members of a pair of goggles, spectacles, or the like, said element comprising a wire frame having upright side members and transverse upper and lower members, said frame being characterized by having the upright side members formed to be attached to said lens-holding members, respectively, throughout a substantial stretch thereof along the outside peripheral surface of the lens-holding members, also by having said lower transverse member connected with each of said side members by an upright open loop disposed forwardly from said lower transverse member, and said upper transverse member being joined to said side pieces, respectively, by relatively short, forwardly extending reaches of the wire component, said wire being of a character suitable to permit bending beyond the elastic limits, whereby the spacing of the lenses and their angular disposition relatively to the bridge of the wearer's nose may be adjusted manually without tools.

4. A pair of goggles, spectacles or the like comprising a pair of lens-holding members and a bridge element combined and cooperating as set forth in claim 2, and further characterized by having a spool-shaped element mounted rotatably on said lower transverse member.

5. A pair of goggles, spectacles, or the like comprising a pair of lens-holding members and a bridge element combined and cooperating as set forth in claim 2, and further characterized by having said wire frame consist of a single piece of wire bent to form the several side members, transverse members, loops and stretches of said element, the ends of said single piece wire component meeting each other at an intermediate portion of one of said upright side members and held in alinement with respect to each other by attachment to the contiguous lens-holding members.

OSWALD B. CARSON.